July 26, 1938.                B. GASPAR                2,125,015
MULTICOLOR PHOTOGRAPHIC MATERIAL AND A PROCESS FOR USING THE SAME
Filed April 2, 1936
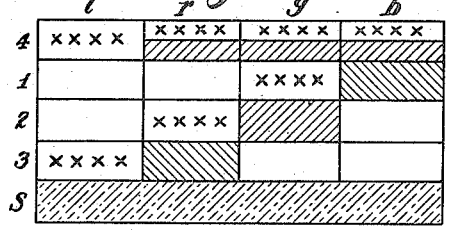
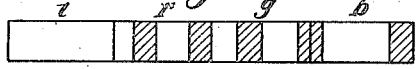
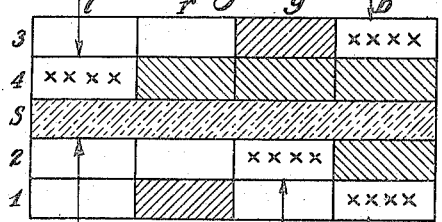
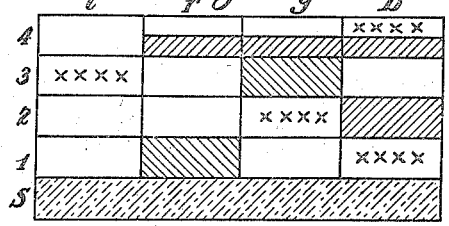
Inventor
Bela Gaspar
By F. Gerald Toye
Attorney Patented July 26, 1938

2,125,015

UNITED STATES PATENT OFFICE 2,125,015

MULTICOLOR PHOTOGRAPHIC MATERIAL AND A PROCESS FOR USING THE SAME

Bela Gaspar, Brussels, Belgium

Application April 2, 1936, Serial No. 72,409 In Germany October 26, 1932

15 Claims. (Cl. 95—2)

It is known to produce photographic two-color pictures by the use of two complementary or substantially complementary colors, one of which absorbs light rays of substantially one half of the visible spectrum, while the other absorbs light rays of the other half of the visible spectrum. Where both colors are present at certain points either mixed together or superimposed one on the other, all visible light is absorbed and the image appears black at these points.

Where a two color process is unsatisfactory for proper color rendering, three colors are used, each of which absorbs one third of the visible spectral range and while such a three-color process is in general quite satisfactory, it might be possible to improve the results by further subdivision of the spectrum into, say, four substantially equal parts by the use of four colors of different absorption, the combined absorptions of the colors covering the visible spectrum.

Three color pictures are often improved by the application of a fourth image, a so-called key-print in a dark color to give the picture sharper definition. This fourth color does not correspond to a further subdivision of the spectrum, i. e. there are used only three color sensation negatives or part pictures for the red, green and blue parts of the spectrum and the additional image in black or a dark color corresponds only to the lights and the shadows of the object without regard to the colors thereof. This so-called "key-print" has been applied by several methods which are complicated and render the process difficult to carry out.

The objects of the present invention are to provide a light sensitive photographic material and a process of using the same, by means of which it is possible to combine such a fourth image with the three part images used in three color photography.

The material according to this invention is very useful in the production of kinematograph films and sound films; for producing artistic effects or for combining a key-print with the three color image.

The material contains, in addition to the silver halide usual in three color work, a supplementary layer, the particular features of which are its color and its sensitivity.

As regards color the additional layer contains a black, blackish or dark colored dyestuff, the color of which is so chosen as to have an absorption identical with at least a part of the absorption of one or more of the dyestuffs contained in the other layers.

As regards sensitivity, this depends upon the special purpose for which the layer is to be used. It is sensitized in respect of those rays which are allowed to pass not only by the dyestuffs incorporated in it, but also by the layer or layers which are situated above it. The region for which this supplementary layer is sensitized, may be identical to that for which one or more of the colored layers is or are sensitized, or may be a region for which the other layers are not sensitized.

The supplementary layer containing a black, blackish or dark colored dyestuff, can be disposed at any position relative to the other layers or may be disposed on the back of the film either alone or with one of the other colored layers.

Printing is performed into the supplementary layer either from the same master image as that which is used for ordinary printing in two or three colors, or from another master image. Positive master images are used if the formation of the multicolor image is obtained by destroying the dyestuff at the exposed places, whilst negative master images are used if the dyestuff is subsequently destroyed at the unexposed parts. The positive or negative master image for the blackish image may be obtained by combining partial pictures in the known manner, for example by combining a multicolor image with a black key-image. The supplementary layer in a multilayer colored material may also be used for a purpose which is independent of the color reproduction.

It is useful to have for the sound track a black or blackish layer either alone, or combined with the other layers necessary to produce the image in two or three colors. In the latter case, the purpose of the black or blackish layer is to increase the density of the sound record. This black layer is sensitized say for the long wave infrared, for example with neocyanine. If the material is subsequently treated in a bath which destroys the dyestuffs at the points of the silver deposit, the sound track part of the material is exposed under a sound master image with white light and a black sound image is obtained. That part of the black layer which is disposed above the colored picture is exposed to infrared light. By this means the black dyestuff is completely destroyed above the colored image and it remains only in the sound track to form the sound record.

In the preceding example the color sensitiveness of the different layers is immaterial, it is only important that the dark colored layer shall be sensitive to at least one color to which none of the colored layers is sensitive.

A sharper definition of the sound record can be obtained if the sound record is present only in a single layer: in this case it is necessary to destroy the dyestuffs in the parts of the colored layer which lie above the dyestuff forming the sound image as follows:—

The dark layer is sensitized e. g. for infrared in such a manner that visible light does not act on it either due to lack of sensitizing or because the color is sufficiently black to absorb any visible light reaching the same. The colored images are printed in the colored layers with visible light to which the individual layers are sensitized, and the sound record is printed with infrared light in the dark layer. Before or after this step, the parts of the colored layers which are situated above the sound track, are diffusely exposed to white light from which the infrared light is filtered out, e. g. by means of a filter of Prussian blue or a filter of naphthothiotricarbocyanine methyliodide of 0.5 gram per square metre. After developing and fixing the dyestuffs are destroyed in all the layers proportionately to the silver deposit present.

The black layer which lies above the colored image may also be used for other purposes. For example, the material may be exposed to infrared light behind a diaphragm of varying light transmission, so that the successive pictures receive decreasing amounts of light. The quantity of silver deposit in the layer sensitized for infrared dyed with a black dyestuff therefore decreases and after the dyestuff has been destroyed at the points of the silver deposit, a grey veil of an intensity increasing up to a complete opaque black is obtained. Afterwards the light transmission of the diaphragm is increased so as to diminish the opacity of the black veil of dyestuff from grey to complete transparency. In this way it is possible to obtain a fading out effect and to pass from one colored scene to another at the place of complete opacity.

It is much more simple to obtain this effect in the manner described above than to reduce the intensity of the printing light.

In the drawing each horizontal band represents one point of each layer of the material used for multicolor photography. The image of the point being spread over the corresponding band, like the image of a light point, is decomposed into a spectrum. Each band is shown divided into four parts corresponding to four principal spectral regions used in this material, for example infrared (*i*), red (*r*) green (*g*) and blue (*b*). The parts which are shaded to their whole height represent a practically complete absorption of the light of these spectral regions.

In Figure 1 layer (1) is colored and dyed for example with 1 gram Chrysophenin (304) per square metre; layer (2) is dyed purple for example with 1 gram Diaminerose G (119) per square metre, and layer (3) is dyed blue-green, e. g. with 1 gram Diamine-pure-blue (424) per square metre. The absorptions for these layers therefore lie in the blue for layer (1), in the green for layer (2) and in the red for layer (3). The band (4) which is shaded up to half of its height indicates a partial absorption in the supplementary layer. This partial absorption is marked in the whole visible spectrum indicating a light grey color, obtained for example by dyeing with 0.5 gram Diazine Black A extra (333) or 0.5 gram Buffalo Black AD (266). The colors are identified above by their numbers in Schultz Farbstofftabellen (5th ed. 1920.)

A light grey color may also be obtained by a distribution of the absorption as is shown for a single layer in Figure 2.

The spectral regions for which the layers are sensitized are marked with crosses. The upper light grey supplementary layer in Figure 1 is sensitized for the whole spectrum from infrared to blue with naphthothiocarbocyanine ethyliodide.

Figure 3 shows a multicolor photographic material in which two layers are disposed on each side of a support (*s*). The dark-colored supplementary layer (4) is dyed e. g. with 0.5 gram Diamineblack BO (403) 0.5 gram per square metre. It is sensitized only for infrared, for example with neocyanine.

Figure 4 shows a material in which the blue-green layer (1) dyed with diamine-pure-blue (424) 1 gram per square metre, is unsensitized i. e. sensitive for blue; the yellow layer (2) dyed with 1 gram per square metre with Chyrsophenine (304) is sensitized for green with thiopseudocyanine-ethyliodide, and the purple layer (3) dyed with 1 gram per square metre with Diaminerose G (119) is sensitized to infrared with benzthiocarbocyanine-ethyliodide. The grey supplementary layer is either unsensitized i. e., blue sensitive, or panchromatic sensitized with naphthothiocarbocyanine-ethyliodide.

*Example 1.*—In the material represented in Figure 1 master images corresponding to the three partial color pictures, are printed with green, red and infrared light, and the sound record is printed with white light containing a sufficient amount of infrared light. After developing and fixing the silver images are transformed into dyestuff images, as described in my prior Patent No. 2,020,775 of November 12, 1935. A multi-color picture is obtained comprising three colored partial pictures combined with a dark key-print and a black sound record formed of three colored sound records superimposed on a dark sound record.

*Example 2.*—With the same material printing is performed in the same way with the exception that the parts of the material which lie above the colored picture are diffusely exposed to blue light. After developing and fixing the dyestuff is destroyed porportionately to the silver deposit as described in my above Patent No. 2,020,775. A multicolor picture is obtained comprising three color partial pictures and a sound record formed of three colored sound records, superimposed on a dark sound record.

*Example 3.*—In the black layer of the material shown in Figure 3 an image is obtained which is independent of the other partial images. Printing is effected: of the green selection image into layer 3 with blue light; of the sound record into layer 4 with infrared light; of the blue selection image with green light into the yellow layer 2, and of the red selection image with blue light into the blue-green layer 1. Layers 1, 2 and 4 are printed from one side and the layer 3 from the other, or alternatively two layers may be printed from each side of the support. These two possibilities are shown by the arrows in Figure 3. The sound record is printed in the supplementary layer 4 with infrared light, the image part of its surface above the colored images being diffusely exposed to infrared light. After developing the dyestuff is destroyed porportionately to the silver deposit and the silver is dissolved in a known manner. The sound record is obtained in the supplementary layer whilst in the image part of the supplementary layer the dyestuff is diffusely destroyed due to the diffuse exposure.

*Example 4.*—In the same material that part of the supplementary layer corresponding to the colored image space is exposed to infrared light of an intensity which is changed from one picture to the other by means of a diaphragm of variable light transmission. After developing the dyestuff is destroyed to an extent dependent on the density of the silver deposit and the silver is dissolved in a known manner. A grey veil of variable opacity is thus obtained. The opacity of the dark layer increases or decreases along the length of the film, changing gradually from one picture to the next.

*Example 5.*—With the material shown in Figure 4 printing is performed from one side into layers 1, 2 and 3 and, from the other side, into layer 4, or into two layers from each side. After developing and fixing the silver image is transformed into a dyestuff image. A multicolor image is obtained formed of three colored partial pictures combined with an independent grey image, the sound record being printed with blue light in the supplementary layer (4). The parts of this layer situated above the multicolor picture are exposed to blue light of constant or varying intensity as in Examples 3 and 4.

It should be understood that the present disclosure is for the purpose of illustration only and that this invention includes all modifications and equivalents which fall within the scope of the appended claims.

What I claim is:

1. The method of producing multi-color moving picture films in a predyed multi-layer light sensitive silver halide material, having at least three layers differently colored by dyestuffs of the shades necessary to form a multi-color image and each being predominantly sensitized for a spectral range such that each of the part images of said multi-colored image may be independently printed into said multi-layer light sensitive silver halide material, and a light sensitive supplementary layer having a sensitivity range different from that of the immediately juxtaposed light sensitive layer and being dyed with a dyestuff which absorbs sufficient light rays throughout the visible spectrum to give a substantially grey to black appearance, which comprises printing the multi-color part pictures into said material, printing another image into said supplementary layer, developing and fixing the latent silver images and selectively destroying the dyestuffs in proportion to the silver deposit.

2. The method of producing multi-color moving picture sound films in a predyed multi-layer light sensitive silver halide material having a picture portion and a sound portion, and having at least three layers differently colored by dyestuffs of the shades necessary to form a multi-color image and each being predominantly sensitized for a spectral range such that each of the part images of said multi-colored image may be independently printed into said multi-layer light sensitive silver halide material, and a supplementary layer dyed with a dyestuff which absorbs sufficient light rays throughout the visible spectrum to give a substantially black appearance and sensitized only to a spectral range to which said first referred to layers are not sensitive, which comprises printing the multi-color part pictures into the picture portion of said first-referred to layers, printing the sound record into the sound portion of said supplementary layer, developing and fixing the latent silver images and selectively destroying the dyestuffs in proportion to the silver deposit.

3. The method of producing multi-color moving picture sound films in a predyed multi-layer light sensitive silver halide material having a picture portion and a sound portion, and having at least three layers differently colored by dyestuffs of the shades necessary to form a multi-color image and each being predominantly sensitized for a spectral range such that each of the part images of said multi-colored image may be independently printed into said multi-layer light sensitive silver halide material, and a supplementary layer dyed with a dyestuff which absorbs sufficient light rays throughout the visible spectrum to give a substantially grey appearance and which is sensitive to the same spectral ranges as said first referred to layers and to an additional spectral range, which comprises printing the multi-color part pictures into the picture portion of said first referred to layers, printing the sound record into the sound portion of all of said layers, diffusely exposing the picture portion of said supplementary layer to light for which it is sensitive and to which said first referred to layers are not sensitive, developing and fixing the latent silver images and selectively destroying the dyestuffs in proportion to the silver deposit.

4. The method of producing multi-color moving picture films in a predyed multi-layer light sensitive silver halide material, having at least three layers differently colored by dyestuffs of the shades necessary to form a multi-color image and each being predominantly sensitized for a spectral range such that each of the part images of said multi-colored image may be independently printed into said multi-layer light sensitive silver halide material, and a supplementary layer dyed with a dyestuff which absorbs sufficient light rays throughout the visible spectrum to give a substantially grey appearance, and which is sensitive to the same spectral ranges as said first referred to layers and to an additional spectral range, which comprises printing the multi-color part pictures into said first referred to layers through said supplementary layer, developing and fixing the latent silver images and selectively destroying the dyestuffs in proportion to the silver deposit.

5. The method of producing multi-color moving picture sound films in a predyed multi-layer light sensitive silver halide material having a picture portion and a sound portion, and having at least three layers differently colored by dyestuffs of the shades necessary to form a multi-color image and each being predominantly sensitized for a spectral range such that each of the part images of said multi-colored image may be independently printed into said multi-layer light sensitive silver halide material, and a supplementary layer dyed with a dyestuff which absorbs sufficient light rays throughout the visible spectrum to give a substantially grey appearance and which is sensitive to the same spectral ranges as said first referred to layers and to an additional spectral range, which comprises printing the multi-color part pictures into the picture portion of said first referred to layers, printing the sound record into the sound portion of all of said layers, diffusely exposing the picture portion of said supplementary layer to light for which it is sensitive and to which said first referred to layers are not sensitive, varying the intensity of this light in the longitudinal direction of the film to produce a fade-out, developing and fixing the latent silver images and selectively destroying the dyestuffs in proportion to the silver deposit.

6. The method of producing multi-color moving picture sound films in a predyed multilayer light sensitive silver halide material having a picture portion and a sound portion, and having at least three layers differently colored by dyestuffs of the shades necessary to form a multi-color image and each being predominantly sensitized for a spectral range such that each of the part images of said multi-colored image may be independently printed into said multilayer light sensitive silver halide material, and a supplementary layer dyed with a dyestuff which absorbs sufficient light rays throughout the visible spectrum to give a substantially black appearance and sensitized only to a spectral range to which said first referred to layers are not sensitive, which comprises printing the multi-color part pictures into the picture portion of said first referred to layers, printing the sound record into the sound portion of said supplementary layer, diffusely exposing the picture portion of said supplementary layer to light for which it alone is sensitive, varying the intensity of this light in the longitudinal directon of the film to produce a fade-out, developing and fixing the latent silver images and selectively destroying the dyestuffs in proportion to the silver deposit.

7. The method of producing multi-color moving picture sound films in a predyed multi-layer light sensitive silver halide material having a picture portion and a sound portion, and having at least three layers differently colored by dyestuffs of the shades necessary to form a multi-color image and each being predominantly sensitized for a spectral range such that each of the part images of said multi-colored image may be independently printed into said multi-layer light sensitive silver halide material, and a supplementary layer dyed with a dyestuff which absorbs sufficient light rays throughout the visible spectrum to give a substantially grey appearance, and sensitized to a spectral region the same as the sensitivity of one of said first referred to layers, but different from that of the immediately juxtaposed light sensitive layer, said supplementary layer being separated from said one of said first referred to layers by a colored layer absorbing light for which said supplementary layer is sensitive, which comprises printing at least one of the multi-color part pictures into the picture portion of said first referred to layers from one side of said film, printing the sound record into the sound portion of said supplementary layer from the other side of said film and diffusely exposing the picture portion of said supplementary layer to light for which it is sensitive, developing and fixing the latent silver images and selectively destroying the dyestuffs in proportion to the silver deposit.

8. The method of producing multi-color moving picture sound films in a predyed multi-layer light sensitive silver halide material having a picture portion and a sound portion, and having at least three layers differently colored, by dyestuffs of the shades necessary to form a multi-color image and each being predominantly sensitized for a spectral range such that each of the part images of said multi-colored image may be independently printed into said multi-layer light sensitive silver halide material, and a supplementary layer dyed with a dyestuff which absorbs sufficient light rays throughout the visible spectrum to give a substantially black appearance, and sensitized only to a spectral region to which none of the first referred to layers is sensitive, which comprises printing the multi-color part pictures into the picture portion of said first referred to layers, printing the sound record into the sound portion of said supplementary layer, diffusely exposing at least one of the first referred to layers in the sound portion to light of a color for which it is sensitive, diffusely exposing the supplementary layer in the picture portion to light of the spectral region for which it alone is sensitive, developing and fixing the latent silver images and selectively destroying the dyestuffs in proportion to the silver deposit.

9. A material for producing multi-color moving picture films including a support and a plurality of predyed light sensitive silver halide layers, including at least three layers differently colored by dyestuffs of the shades necessary to form a multi-color image and each being predominantly sensitized for a spectral range such that each of the part images of said multi-colored image may be independently printed into said light sensitive silver halide layers, and a light sensitive supplementary layer having a sensitive range different from that of the immediately juxtaposed light sensitive layer and being dyed with a dyestuff which absorbs sufficient light rays throughout the visible spectrum to give a substantially grey to black appearance, the dyestuffs in all of said layers being capable of selective destruction in proportion to a silver image by a dye destroying agent.

10. A material for producing multi-color moving picture films including a support and a plurality of predyed light sensitive silver halide layers, including at least three layers differently colored by dyestuffs of the shades necessary to form a multi-color image and each being predominantly sensitized for a spectral range such that each of the part images of said multi-colored image may be independently printed into said light sensitive silver halide layers, and a supplementary layer dyed with a dyestuff which absorbs sufficient light rays throughout the visible spectrum to give a substantially grey appearance, said supplementary layer being sensitized to at least one color to which one of the first referred to layers other than the immediately juxtaposed layer is sensitized, the dyestuffs in all of said layers being capable of selective destruction in proportion to a silver image by a dye destroying agent.

11. A material for producing multi-color moving picture films including a support and a plurality of predyed light sensitive silver halide layers, including at least three layers differently colored by dyestuffs of the shades necessary to form a multi-color image and each being predominantly sensitized for a spectral range such that each of the part images of said multi-colored image may be independently printed into said light sensitive silver halide layers, and a supplementary layer dyed with a dyestuff which absorbs sufficient light rays throughout the visible spectrum to give a substantially grey appearance, said supplementary layer being sensitized to at least one color to which one of the first referred to layers is sensitive, and to a color to which none of the first referred to layers is sensitive, the dyestuffs in all of said layers being capable of selective destruction in proportion to a silver image by a dye destroying agent.

12. A material for producing multi-color moving picture films including a support and a plurality of predyed light sensitive silver halide layers, including at least three layers differently colored by dyestuffs of the shades necessary to form a multi-color image and each being predominantly sensitized for a spectral range such that each of the part images of said multi-colored image may be independently printed into said light sensitive silver halide layers, and a supplementary layer dyed with a dyestuff which absorbs sufficient light rays throughout the visible spectrum to give a substantially black appearance, said supplementary layer being sensitized only to a color to which none of the first referred to layers is sensitive, the dyestuffs in all of said layers being capable of selective destruction in proportion to a silver image by a dye destroying agent.

13. A material for producing multi-color moving picture films including a support and an infra-red sensitive blue-green dyed silver halide layer, a red sensitive purple dyed silver halide layer, a green sensitive yellow dyed silver halide layer, and a grey dyed panchromatic silver halide layer including a sensitivity range different from that of the immediately juxtaposed light sensitive layer, all of said layers being disposed one over the other on said support, the dyestuffs in said layers being capable of selective destruction in proportion to a silver image by a dye destroying agent.

14. A material for producing multi-color moving picture films including a support, a black infra-red sensitive silver halide layer and a purple dyed blue sensitive silver halide layer disposed thereover on one side of said support, a yellow dyed green sensitive silver halide layer and a blue-green dyed blue sensitive silver halide layer disposed thereover on the other side of said support, the dyestuffs of said layers being capable of selective destruction in proportion to a silver image by a dye destroying agent.

15. A material for producing multi-color moving picture films including a support, a blue sensitive blue-green dyed silver halide layer, a green sensitive yellow dyed silver halide layer, an infra-red sensitive purple dyed silver halide layer and a grey colored blue sensitive supplementary silver halide layer disposed respectively one over the other on said support, the dyestuffs in all of said layers being capable of selective destruction in proportion to a silver image by a dye destroying agent.

BELA GASPAR.